(12) United States Patent
Tateno et al.

(10) Patent No.: US 10,955,053 B2
(45) Date of Patent: Mar. 23, 2021

(54) MANUAL UNLOCKING DEVICE FOR PARKING LOCK MECHANISM

(71) Applicants: TOYOTA JIDOSHA KABUSHIKI KAISHA, Toyota (JP); TOYODA IRON WORKS CO., LTD., Toyota (JP)

(72) Inventors: Hiroyuki Tateno, Nagoya (JP); Kiyonori Takagi, Okazaki (JP); Koichi Okuda, Toyota (JP); Atsushi Kawamoto, Toyota (JP); Ryuji Ibaraki, Miyoshi (JP); Yuji Yasuda, Miyoshi (JP); Haruhisa Suzuki, Miyoshi (JP); Hideki Matsubo, Toyota (JP); Junya Abe, Toyota (JP)

(73) Assignees: TOYOTA JIDOSHA KABUSHIKI KAISHA, Toyota (JP); TOYODA IRON WORKS CO., LTD., Toyota (JP)

( * ) Notice: Subject to any disclaimer, the term of this patent is extended or adjusted under 35 U.S.C. 154(b) by 260 days.

(21) Appl. No.: 15/786,161

(22) Filed: Oct. 17, 2017

(65) Prior Publication Data

US 2018/0135753 A1 May 17, 2018

(30) Foreign Application Priority Data

Nov. 11, 2016 (JP) .............................. JP2016-220457

(51) Int. Cl.
*F16H 63/34* (2006.01)
*F16H 61/22* (2006.01)
*F16D 127/04* (2012.01)

(52) U.S. Cl.
CPC ..... *F16H 63/3491* (2013.01); *F16H 63/3466* (2013.01); *F16D 2127/04* (2013.01); *F16H 2061/226* (2013.01)

(58) Field of Classification Search
CPC ............... F16H 63/3491; F16H 63/483; F16H 63/3466; F16H 2061/226; F16H 2127/04;
(Continued)

(56) References Cited

U.S. PATENT DOCUMENTS

| 2011/0132121 A1* | 6/2011 | Park .................... F16H 63/3466 74/473.12 |
| 2015/0122068 A1* | 5/2015 | Hopkins ............. F16H 63/3491 74/473.24 |

(Continued)

FOREIGN PATENT DOCUMENTS

| CN | 105015519 A | 11/2015 |
| DE | 102009019812 | * 4/2010 |

(Continued)

OTHER PUBLICATIONS

Machine language translation of DE102009019812 for Schneider.*

*Primary Examiner* — Mark A Manley
(74) *Attorney, Agent, or Firm* — Oliff PLC

(57) ABSTRACT

A manual unlocking device for a parking lock mechanism includes an operation lever that rotates when the parking lock mechanism is switched from a locked state to an unlocked state. The operation lever is arranged outside an occupant space of a vehicle cabin and is configured that a tool can be coupled to a rotation center thereof from the occupant space. The manual unlocking device for the parking lock mechanism is configured to switch the parking lock mechanism from the locked state to the unlocked state by integral rotation of the operation lever with the tool when the tool, which is coupled to the operation lever, rotates in a state where the tool is arranged on the rotation center of the operation lever.

4 Claims, 4 Drawing Sheets

(58) Field of Classification Search
CPC .............. F16H 61/32; F16H 61/2807; F16H 2057/0062; F16H 63/3416–3475; B60T 7/104
USPC ...................................................... 192/219.6
See application file for complete search history.

(56) References Cited

U.S. PATENT DOCUMENTS

| | | |
|---|---|---|
| 2015/0298663 A1 | 10/2015 | Tashiro |
| 2017/0030465 A1* | 2/2017 | Dearden ............. F16H 63/3491 |

FOREIGN PATENT DOCUMENTS

| | | |
|---|---|---|
| GB | 2525038 * | 10/2015 |
| JP | S60-145914 U | 9/1985 |
| JP | 2004-230952 A | 8/2004 |
| JP | 2013-167289 A | 8/2013 |
| JP | 2013-170699 A | 9/2013 |
| JP | 2015-206419 A | 11/2015 |

\* cited by examiner

MANUAL UNLOCKING DEVICE FOR PARKING LOCK MECHANISM

INCORPORATION BY REFERENCE

The disclosure of Japanese Patent Application No. 2016-220457 filed on Nov. 11, 2016 including the specification, drawings and abstract is incorporated herein by reference in its entirety.

BACKGROUND

1. Technical Field

The disclosure relates to a manual unlocking device for a parking lock mechanism.

2. Description of Related Art

Conventionally, a shift-by-wire system that can change a range of an automatic transmission by an electric motor has been known (for example, see Japanese Patent Application Publication No. 2004-230952 (JP 2004-230952 A)). In this shift-by-wire system, in accordance with an operation of a selection switch by a driver, a detent plate is driven by the electric motor, and the range of the automatic transmission can thereby be shifted.

In addition, the shift-by-wire system disclosed in JP 2004-230952 A is provided with a fail-safe structure that allows manual shifting of the range during failure of the selection switch and the like. More specifically, the selection lever is provided in a console, and the selection lever is coupled to the detent plate via a linkage or the like. During the failure of the selection switch, a cover member that covers an opening of the console is removed, and a screwdriver is inserted in the selection lever from the opening. In this way, the selection lever can be operated from an occupant space in a vehicle cabin. When the driver operates the selection lever, the detent plate is driven to shift the range.

SUMMARY

Here, the selection lever is formed to extend upward (to the opening side) from a fulcrum shaft and is configured to rotate back and forth with the fulcrum shaft being a center. Accordingly, when the selection lever is operated by using the screwdriver, the screwdriver and the selection lever rotate back and forth.

The above fail-safe structure can be used as a manual unlocking device for a parking lock mechanism. In this case, movable ranges of the screwdriver and the selection lever have to be secured in the console. This leads to such a problem that a space required for actuation of the fail-safe structure as the manual unlocking device is increased.

The disclosure provides a manual unlocking device for a parking lock mechanism capable of reducing a space required for actuation thereof.

A manual unlocking device for a parking lock mechanism according to the disclosure is a device capable of switching the parking lock mechanism, which can be switched between a locked state and an unlocked state by an actuator, to the unlocked state by a manual operation when the parking lock mechanism is in the locked state. The manual unlocking device includes an operation lever that rotates when the parking lock mechanism is switched from the locked state to the unlocked state. The operation lever is arranged outside an occupant space of a vehicle cabin and is configured such that a tool can be coupled to a rotation center thereof from the occupant space. The manual unlocking device for the parking lock mechanism is configured to switch the parking lock mechanism from the locked state to the unlocked state by integral rotation of the operation lever with the tool when the tool, which is coupled to the operation lever, rotates in a state where the tool is arranged on the rotation center of the operation lever.

With such a configuration, in order to couple the tool to the rotation center of the operation lever, a space for arranging the tool is secured. In this way, the operation lever can rotate by using the tool from the occupant space. Accordingly, a space in which the tool rotates back and forth does not have to be secured. Thus, a space required for actuation of the manual unlocking device can be reduced.

In the manual unlocking device for the parking lock mechanism, the operation lever may be provided on a floor tunnel, and the operation lever may be configured to rotate along a surface of the floor tunnel.

With such a configuration, when the operation lever rotates, interference of the operation lever with other components outside the occupant space can be suppressed.

In this case, an air conditioner duct may be provided above the floor tunnel, and the rotation center of the operation lever may be arranged at a position that does not overlap the air conditioner duct when seen in a plan view.

With such a configuration, the tool can be coupled to the rotation center of the operation lever without interference of the tool with the air conditioner duct.

According to the manual unlocking device for the parking lock mechanism, a space required for actuation thereof can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
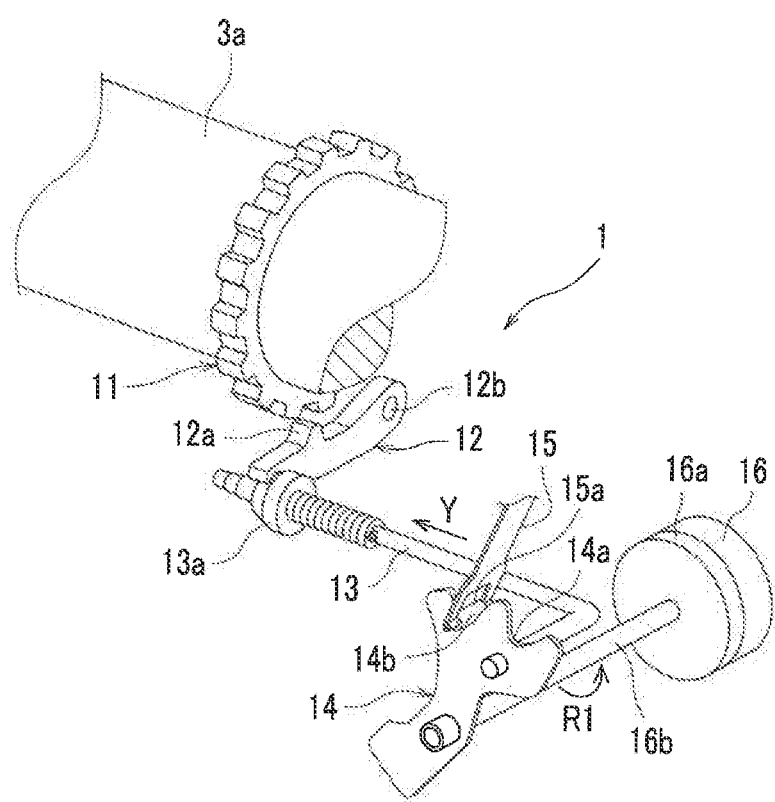
FIG. 1 is a schematic configuration diagram of a parking lock mechanism according to this embodiment.

A description will hereinafter be made on an embodiment on the basis of the drawings. Note that a description will hereinafter be made on a case where the disclosure is applied to a manual unlocking device for a parking lock device of a front-engine, rear-wheel-drive (FR) vehicle.

The parking lock device includes a parking lock mechanism 1 and a manual unlocking device 2 that unlocks the parking lock mechanism 1 by a manual operation.

First, a description will be made on a schematic configuration of the parking lock mechanism 1 with reference to FIG. 1.

The parking lock mechanism 1 is configured to be switchable between a locked state (a Parking position) where rotation of a power transmission shaft 3a is disallowed, and an unlocked state (no parking position) where the rotation of the power transmission shaft 3a is allowed. Note that FIG. 1 shows the unlocked state. The power transmission shaft 3a is provided in an automatic transmission 3 (see FIG. 3) of a vehicle, for example, and is configured to transmit power for vehicle travel.

This parking lock mechanism 1 includes a parking gear 11, a parking pawl 12, a parking rod 13, a detent plate 14, a detent spring 15, and an electric motor 16.

The parking gear 11 is provided on an outer periphery of the power transmission shaft 3a and is configured to integrally rotate with the power transmission shaft 3a.

The parking pawl 12 is provided at a position that is near and on a lower side of the parking gear 11, and has a projection 12a that can mesh with the parking gear 11. This parking pawl 12 can rotate about a support shaft 12b and is urged to a side away from the parking gear 11 by a return spring (not shown).

One end of the parking rod 13 is coupled to the detent plate 14, and the other end thereof is provided with a cam 13a. The cam 13a is arranged at a position that is on a lower side of the parking pawl 12 and on an opposite side from the support shaft 12b. This parking rod 13 is configured to move in an axial direction when the detent plate 14 rotates.

The detent plate 14 is integrally provided with a shaft 16b and is configured to rotate by the shaft 16b. In this detent plate 14, a first recess 14a and a second recess 14b are formed along a rotational direction.

The detent spring 15 is a plate spring, for example, and is provided to keep a position of the detent plate 14. A roller 15a is provided at a tip of the detent spring 15 in a freely rotatable manner, and the roller 15a is engaged with either one of the first recess 14a and the second recess 14b.

An output shaft (not shown) of the electric motor 16 is coupled to the shaft 16b via a reduction mechanism 16a. This electric motor 16 is configured to cause rotation of the shaft 16b and the detent plate 14 in accordance with a control signal from an ECU (not shown). Note that the electric motor 16 is one example of the "actuator" of the disclosure.

Next, a description will be made on an operation of the parking lock mechanism 1.

First, when the ECU requests switching of the parking lock mechanism 1 to the locked state (the parking position) in the unlocked state (the no parking position), the electric motor 16 causes the rotation of the shaft 16b and the detent plate 14 in an R1 direction. In this way, the parking rod 13 moves in a Y direction. Accordingly, the cam 13a of the parking rod 13 pushes up the parking pawl 12 against an urging force of the return spring, and the projection 12a of the parking pawl 12 meshes with the parking gear 11. In this way, the parking lock mechanism 1 is brought into the locked state where the rotation of the power transmission shaft 3a is disallowed. At this time, because the roller 15a of the detent spring 15 is engaged with the first recess 14a of the detent plate 14, the position of the detent plate 14 is kept, and the parking lock mechanism 1 is held in the locked state.

Meanwhile, when the ECU requests switching of the parking lock mechanism 1 to the unlocked state in the locked state, the electric motor 16 causes the rotation of the shaft 16b and the detent plate 14 in an opposite direction from the R1 direction. In this way, the parking rod 13 moves in an opposite direction from the Y direction. Accordingly, a large-diameter portion of the cam 13a evacuates from a region below the parking pawl 12. Thus, the parking pawl 12 is pushed down by the urging force of the return spring, and the projection 12a of the parking pawl 12 is unmeshed from the parking gear 11. In this way, the parking lock mechanism 1 is brought into the unlocked state where the rotation of the power transmission shaft 3a is allowed. At this time, because the roller 15a of the detent spring 15 is engaged with the second recess 14b of the detent plate 14, the position of the detent plate 14 is kept, and the parking lock mechanism 1 is held in the unlocked state.

Figure 2:
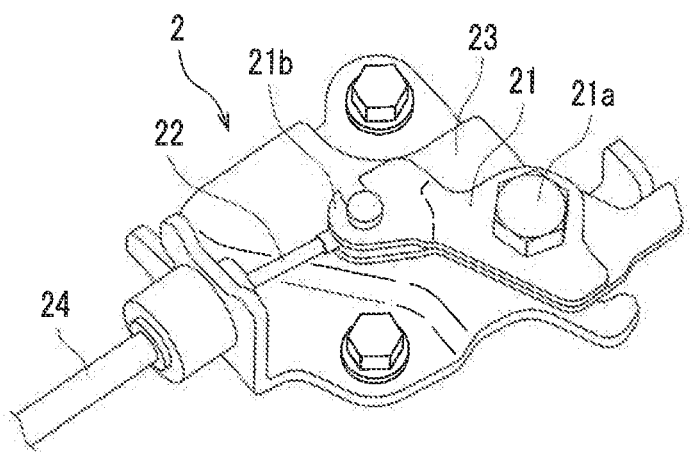
FIG. 2 is a perspective view of an operation lever of a manual unlocking device according to this embodiment.

Next, a description will be made on the manual unlocking device 2 according to the embodiment with reference to FIG. 2 to FIG. 4.

The manual unlocking device 2 is provided to forcibly switch the parking lock mechanism 1 in the locked state to the unlocked state manually. Note that a situation where the parking lock mechanism 1 has to be manually switched to the unlocked state includes failure of the electric motor 16 (see FIG. 1) and running out of a battery, for example. As shown in FIG. 2, this manual unlocking device 2 includes an operation lever 21, a cable 22, and an idling mechanism (not shown).

The operation lever 21 is rotatably provided in a housing 23. At a rotation center of this operation lever 21, a projection 21a that is hexagonal when seen in a rotational axis direction, that is, when seen in a plan view. This projection 21a is configured to be able to be fitted to a tool 100 (see FIG. 6), which will be described below. That is, the operation lever 21 is configured that the tool 100 can be coupled to the rotation center thereof. A holder section 21b that holds the cable 22 is formed at a tip of the operation lever 21.

Figure 3:
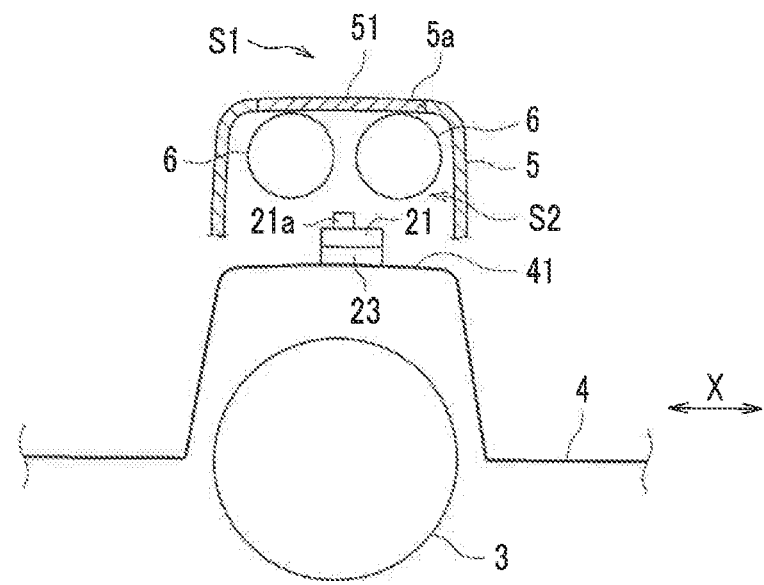
FIG. 3 is a schematic view that illustrates a position of the operation lever in FIG. 2.
Figure 4:
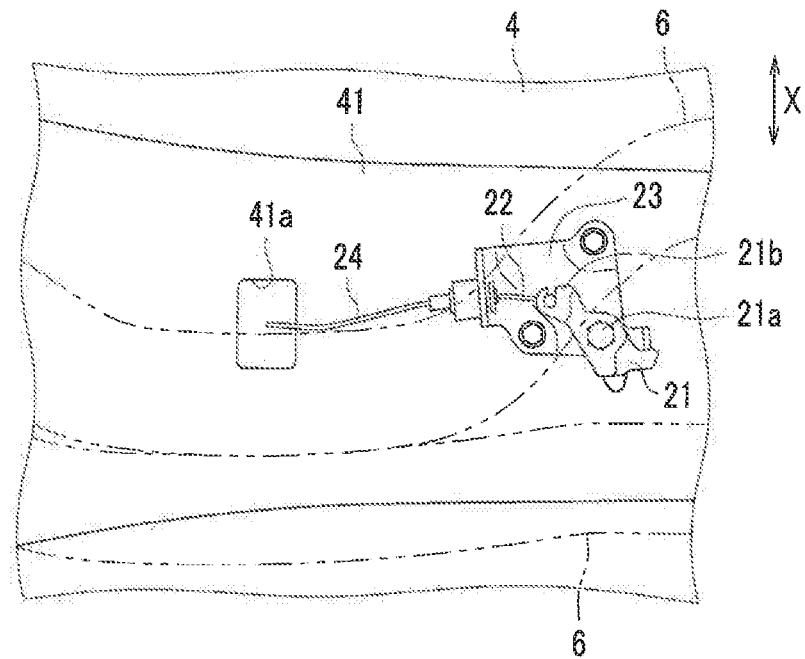
FIG. 4 is a plan view that illustrates a positional relationship between the operation lever in FIG. 2 and an air conditioner duct.

As shown in FIG. 3 and FIG. 4, the housing 23 is fixed to a floor tunnel 41 of a floor panel 4. Accordingly, the operation lever 21 is provided on the floor tunnel 41 via the housing 23, and a rotational axis thereof faces a vertical direction. Thus, the operation lever 21 is configured to rotate along a surface of the floor tunnel 41. In addition, the rotation center of the operation lever 21 is arranged substantially at a center of the floor tunnel 41 in a vehicle width direction (an X direction). The floor tunnel 41 is formed to extend in a longitudinal direction of the vehicle. The automatic transmission 3, a propeller shaft (not shown), and the like are arranged below the floor tunnel 41.

As shown in FIG. 3, an interior member 5 is provided above the floor tunnel 41. This interior member 5 is a center console that is provided between a driver's seat and a passenger's seat, for example, and is configured to partition an occupant space S1 in a vehicle cabin from the outside of the occupant space. Accordingly, the operation lever 21 is arranged outside the occupant space. The interior member 5 is formed with an opening 5a at a position that corresponds to the operation lever 21 when seen in the plan view. A cover 51 that covers the opening 5a is detachably attached to the opening 5a.

In a space S2 between the floor tunnel 41 and the interior member 5, in addition to the operation lever 21, an air conditioner duct 6, the ECU (not shown), and the like are arranged. This air conditioner duct 6 is provided to deliver conditioned air (cold air and warm air) to a rear seat side and, as shown in FIG. 4, is formed to extend in the longitudinal direction of the vehicle. In addition, the air conditioner duct 6 is arranged at a position that does not overlap the rotation center of the operation lever 21 when seen in the plan view. The air conditioner duct 6 is arranged above a major portion of the housing 23 and the holder section 21b of the operation lever 21. The major portion of the housing 23 and the holder section 21b of the operation lever 21 are in states of being hidden under the air conditioner duct 6 when seen in the plan view.

The cable 22 is provided to transmit an operation force to the idling mechanism when the operation lever 21 is operated (rotates). One end of this cable 22 is coupled to the operation lever 21, and the other end thereof is coupled to the idling mechanism. The cable 22 is movably accommodated in a cable housing 24. One end of the cable housing 24 is coupled to the housing 23, and the cable 22 that is drawn out from the end thereof is coupled to the operation lever 21. Note that the cable 22 and the cable housing 24 are led to a lower side of the floor tunnel 41 via an opening 41a that is formed in the floor tunnel 41, and are guided to the idling mechanism. The opening 41a is arranged substantially at the center of the floor tunnel 41 in the vehicle width direction.

The idling mechanism is provided between the cable 22 and the shaft 16b (see FIG. 1). This idling mechanism is coupled to the operation lever 21 via the cable 22, is located at a normal position when the operation lever 21 is not operated (does not rotate), and is located at an actuated position when the operation lever 21 is operated. The idling mechanism is configured that, in the cases where the parking lock mechanism 1 is in the locked state and the idling mechanism moves from the normal position to the actuated position by the operation of the operation lever 21, the idling mechanism transmits the operation force thereof to the shaft 16b, so as to cause the rotation of the detent plate 14 (see FIG. 1) in the opposite direction from the R1 direction. Meanwhile, the idling mechanism is configured that, in the cases where the parking lock mechanism 1 is in the unlocked state and the idling mechanism moves from the normal position to the actuated position by the operation of the operation lever 21, the idling mechanism does not transmit the operation force to the shaft 16b. Note that, when the idling mechanism is located at the normal position, the shaft 16b can rotate by the electric motor 16 without being interfered by the idling mechanism, and the parking lock mechanism 1 can be switched between the locked state and the unlocked state.

Next, a description will be made on an operation of the manual unlocking device 2 at the time when the parking lock mechanism 1 in the locked state is forcibly switched to the unlocked state manually with reference to FIG. 5 and FIG. 6.

Figure 5:
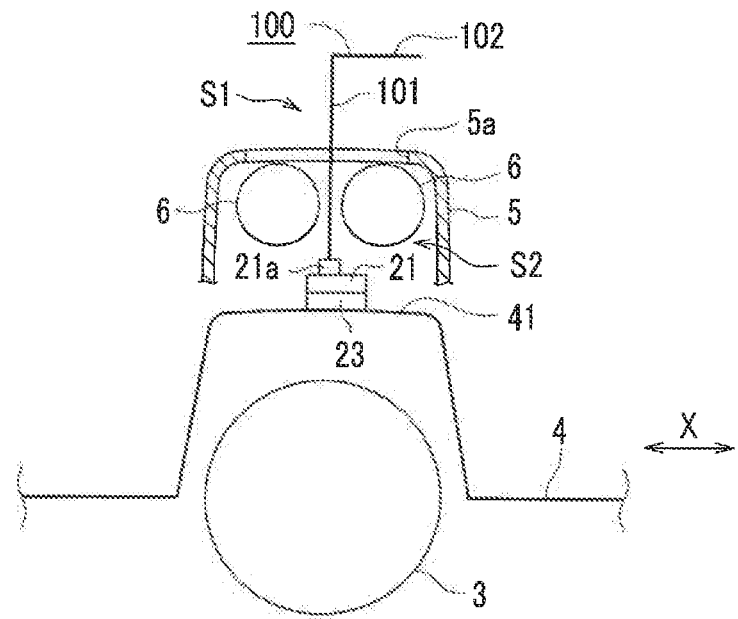
FIG. 5 is a schematic view of a state where a tool is coupled to the operation lever in FIG. 3.

First, as shown in FIG. 5, the cover 51 (see FIG. 3) is removed from the opening 5a of the interior member 5. At this time, the projection 21a of the operation lever 21 can be recognized visually via the opening 5a from the occupant space S1. That is, in the space S2, the air conditioner duct 6, the ECU (not shown), and the like are provided in a manner not to overlap the projection 21a when seen in the plan view. Then, the tool 100 is coupled to the projection 21a of the operation lever 21 via the opening 5a from the occupant space S1.

Figure 6:
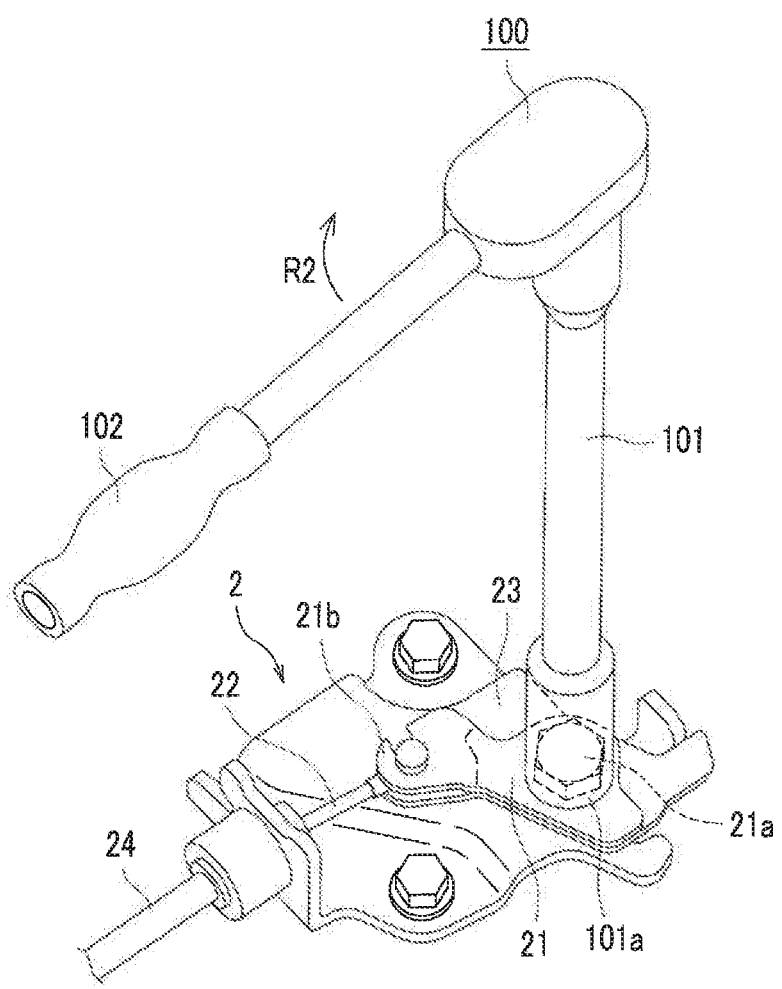
FIG. 6 is a perspective view of a state where the tool is coupled to the operation lever in FIG. 2.

Here, as shown in FIG. 6, the tool 100 is an L-shaped box wrench, for example, and includes: a shaft 101 that has a socket 101a at a tip; and a grip 102 that is provided at a base end of the shaft 101. The socket 101a is formed with a recess that can be fitted to the projection 21a of the operation lever 21. The grip 102 is formed to extend from the base end of the shaft 101 in an orthogonal direction to the shaft 101.

As shown in FIG. 5, the shaft 101 of the tool 100 is inserted in the space S2 via the opening 5a, and the socket 101a (see FIG. 6) is fitted to the projection 21a of the operation lever 21. At this time, the shaft 101 is arranged on the rotation center of the operation lever 21. That is, the shaft 101 is coaxially arranged with the rotational axis of the operation lever 21. In addition, the grip 102 is arranged inside the occupant space S1.

When the grip 102 rotates about the shaft 101 in an R2 direction (see FIG. 6) from this state, the operation lever 21 integrally rotates with the tool 100 in the R2 direction. Accordingly, the cable 22 is drawn out from the cable housing 24, and the idling mechanism moves from the normal position to the actuated position.

Then, when the idling mechanism moves from the normal position to the actuated position, the operation force is transmitted to the shaft 16b (see FIG. 1), and the detent plate 14 (see FIG. 1) rotates in the opposite direction from the R1 direction. In this way, the parking lock mechanism 1 is switched from the locked state to the unlocked state.

In this embodiment, as described above, it is configured that, when the grip 102, which is arranged inside the occupant space S1, rotates about the shaft 101 in the state where the socket 101a of the tool 100 is fitted to the projection 21a of the operation lever 21, the operation lever 21 integrally rotates with the tool 100, so as to switch the parking lock mechanism 1 from the locked state to the unlocked state. With such a configuration, in order to couple the tool 100 to the rotation center of the operation lever 21, a space for arranging the shaft 101 of the tool 100 is secured in the space S2 between the floor tunnel 41 and the interior member 5. In this way, the operation lever 21 can rotate by using the tool 100 from the occupant space S1. Accordingly, a space in which the tool 100 rotates back and forth does not have to be secured between the floor tunnel 41 and the interior member 5. Thus, a space required for actuation of the manual unlocking device 2 can be reduced. That is, a movable range of the tool 100 (a range where the grip 102 moves) for the rotation of the operation lever 21 is set within the occupant space S1. Accordingly, only the space for arranging the shaft 101 of the tool 100 is required in the space S2. Thus, the space required for the actuation of the manual unlocking device 2 can be reduced in the space S2. As a result, an interior of the space S2 can efficiently be used. For example, a cross-sectional area of the air conditioner duct 6 can be increased.

In this embodiment, the operation lever 21 is rotatably provided on the surface of the floor tunnel 41. Accordingly, when the operation lever 21 rotates, interference of the operation lever 21 with components in the space S2, such as the air conditioner duct 6 and the ECU (not shown), can be suppressed.

In this embodiment, the rotation center of the operation lever 21 does not overlap the air conditioner duct 6 when seen in the plan view. Thus, the tool 100 does not interfere with the air conditioner duct 6, and the tool 100 can be coupled to the rotation center of the operation lever 21.

In this embodiment, the rotation center of the operation lever 21 is arranged substantially at the center of the floor tunnel 41 in the vehicle width direction (the X direction). Thus, even when arrangement of the components in the space S2 is horizontally reversed in a left hand drive vehicle and a right hand drive vehicle, the cable 22 can be led below from the opening 41a of the floor tunnel 41. That is, the opening 41a of the floor tunnel 41 can be used for both of the left hand drive vehicle and the right hand drive vehicle. Thus, there is no need to form two openings (the opening dedicated to the left hand drive vehicle and the opening dedicated to the right hand drive vehicle).

Note that the embodiment disclosed herein is illustrative in all respects and thus does not serve as a basis of narrow interpretation. Therefore, the technical scope of the disclosure should not be construed by the above-described embodiment only but is defined on the basis of the claims. In addition, the technical scope of the disclosure includes all modifications falling within the claims and equivalents thereof.

For example, in this embodiment, the example in which the parking lock mechanism 1 is switched between the locked state and the unlocked state has been described. However, the disclosure is not limited thereto. For example, the parking lock mechanism may be able to be shifted to the P position, a D position, an N position, or an R position. In this case, the parking lock mechanism 1 is brought into the locked state at the P position and is brought into the unlocked state at any of the other positions.

In this embodiment, the example in which the tool 100 is formed in the L shape has been described. However, the disclosure is not limited thereto, and the tool may be formed in a T shape.

In this embodiment, the example in which the operation lever 21 is provided on the floor tunnel 41 has been described. However, the disclosure is not limited thereto, and the operation lever may be provided on another highly rigid portion.

In this embodiment, the example in which the air conditioner duct 6 and the ECU are provided in the space S2 between the floor tunnel 41 and the interior member 5 has been described. However, the disclosure is not limited thereto, and components other than the air conditioner duct and the ECU may be provided in the space between the floor tunnel and the interior member.

In this embodiment, the example in which the output shaft of the electric motor 16 and the shaft 16b, which is coupled to the detent plate 14, are coaxially arranged has been described. However, the disclosure is not limited thereto, and the output shaft of the electric motor and the shaft, which is coupled to the detent plate, may be arranged in parallel.

In this embodiment, the cover 51 that covers the opening 5a may be a bottom plate of the console box.

The disclosure can be used as the manual unlocking device for the parking lock mechanism.

What is claimed is:

1. A manual unlocking device for a parking lock mechanism, the manual unlocking device being provided separately from the parking lock mechanism, the parking lock mechanism being switchable between a locked state and an unlocked state by an actuator, and the parking lock mechanism being switchable to the unlocked state by a manual operation when the parking lock mechanism is in the locked state, the manual unlocking device comprising:
    an operation lever configured to rotate when the parking lock mechanism is switched from the locked state to the unlocked state, and
    a cable that is directly coupled to the operation lever and provided to transmit an operation force to an idling mechanism when the operation lever rotates, wherein
    the operation lever is arranged outside an occupant space in a vehicle cabin,
    the operation lever is configured such that a tool can be coupled to a rotation center of the operation lever from the occupant space,
    the manual unlocking device is configured to switch the parking lock mechanism from the locked state to the unlocked state by integral rotation of the operation lever with the tool when the tool, which is coupled to the operation lever, rotates in a state where the tool is arranged on the rotation center of the operation lever and transmission of an operation force to the idling mechanism through the cable when the operation lever rotates,
    the operation lever is a single member that includes a projecting section configured to be fitted to the tool and a holder section configured to hold the cable,
    the projecting section is at the rotation center of the operation lever, and the operating lever is configured to rotate about the rotation center when the tool is arranged on the projecting section at the rotation center of the operation lever, and
    the projecting section is closer to the rotation center than the holder section.

2. The manual unlocking device for the parking lock mechanism according to claim 1, wherein
    the operation lever is provided on a floor tunnel, and
    the operation lever is configured to rotate along a surface of the floor tunnel.

3. The manual unlocking device for the parking lock mechanism according to claim 2, wherein
    an air conditioner duct is provided above the floor tunnel, and
    the rotation center of the operation lever is arranged at a position that does not overlap the air conditioner duct when seen in a plan view.

4. The manual unlocking device for the parking lock mechanism according to claim 1, wherein
    the projecting section and the holder section are on a same plane of the operation lever.

* * * * *